Dec. 10, 1963     J. C. DAVIS ETAL     3,114,090
PEAK VALUE DETECTOR
Filed March 27, 1962
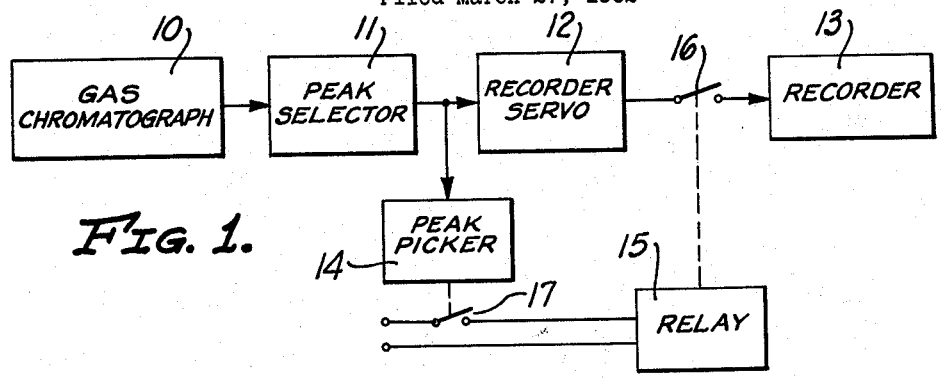
FIG. 1.
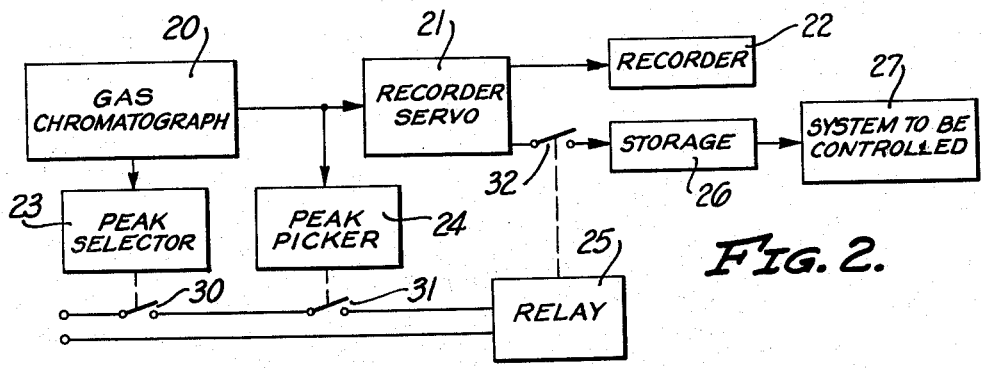
FIG. 2.
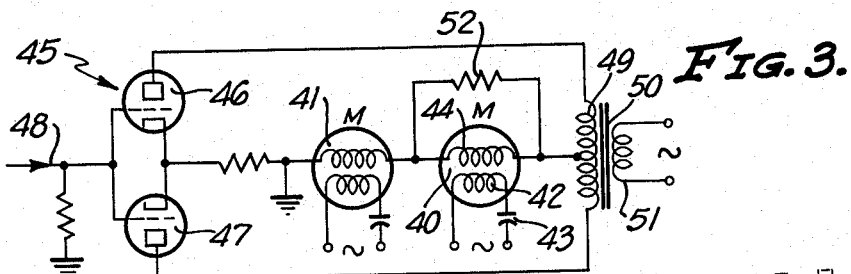
FIG. 3.
FIG. 4.
FIG. 5.
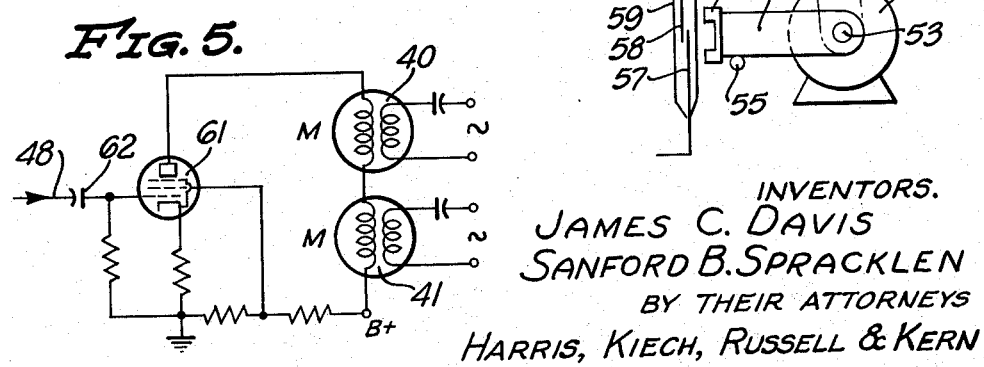
INVENTORS.
JAMES C. DAVIS
SANFORD B. SPRACKLEN
BY THEIR ATTORNEYS
HARRIS, KIECH, RUSSELL & KERN

3,114,090
PEAK VALUE DETECTOR
James C. Davis and Stanford B. Spracklen, Fullerton, Calif., assignors to Beckman Instruments, Inc., a corporation of California
Filed Mar. 27, 1962, Ser. No. 182,820
11 Claims. (Cl. 318—65)

This invention relates to data recording and control circuitry suitable for use with chromatographic analyzers and the like and, in particular, to equipment for determining the occurrence of the maximum value or the minimum value of signal peaks and actuating output devices in accordance therewith. Typically, the peak detector may be used to actuate a recorder for recording only the maximum value of a peak or peaks in an analyzer output. As another example, the peak detector may be used to provide input signals for a control circuit which operates as a function of the maximum value of signal peaks, with the maximum value being fed directly to the control circuit or through a storage means. Alternatively, the peak detector may be used to provide an indication of the minimum value of a signal peak, as when it is desired to determine the area of the peak. The invention will be described herein as used in conjunction with a gas chromatograph.

A gas chromatograph produces an output in the form of a train of signal peaks for each sample introduced into the instrument, with the time of occurrence of a peak identifying the particular component of the sample which produces the peak and with the magnitude of the peak constituting a measure of the quantity of the particular component present in the sample.

In process monitoring, a sample will be introduced into the analyzer periodically resulting in an output in the form of a cyclical train of signal peaks, with the change in maximum value of a particular peak in each successive train indicating the trend of a particular constituent of the sample being analyzed. The output of the conventional analyzer will be a chart having many peaks thereon with considerable space between some of the peaks. In order to eliminate the large quantity of undesired data, trend recorders have been developed which produce a record indicating only the change in maximum value of a particular peak or peaks of the train. Several typical trend recorders are shown in U.S. Patent No. 2,899,258.

Another form of trend recorder is shown in the copending application of Del Duca et al, Serial No. 9,864, filed February 19, 1960, and assigned to the same assignee as the present application. In this form of trend recorder, a signal corresponding to the maximum value of a signal peak is fed into a storage system to provide a continuous input for a recorder or control circuit, with the input to the storage being switched each time the signal peak of interest reaches a maximum.

All of the instruments referred to above utilize a component which detects the maximum value of a signal peak. In U.S. Patent No. 2,899,258, this component is referred to as a slope change detector, as it measures the change from positive to negative slope of the signal peak, which occurs at the maximum point of the peak. In the aforesaid copending application, the component is identified as a peak picker and corresponds to the slope change detector of the patent. Several specific embodiments of peak pickers are shown in the aforementioned patent and application.

It is an object of the present invention to provide a new and improved peak picker or peak value detector. A particular object is to provide such a device which is relatively insensitive to noise spikes occurring in the analyzer output. Another object is to provide a peak value detector which is simple, rugged, reliable and inexpensive.

It is an object of the invention to provide a peak value detector for operation with a chromatographic analyzer or the like which produces an electrical output in the form of a train of signal peaks including a driving circuit having an output varying in phase as a function of the slope of a signal peak connected as an input thereto, a reversible motor, means for connecting the driving circuit output to the motor for controlling the direction of rotation thereof as a function of the output phase, stop means for limiting the movement of the motor to a relatively small range between stops, electrical switch means for controlling an output device, and means carried by the motor for actuating the switch means when at one of the stops, with the motor moving from one stop to the other and actuating the switch means when the slope of a peak changes.

A further object is to provide apparatus which may be used to determine the maximum value of a signal peak, as when the shape changes from positive to negative, and which may be used to determine the minimum value of a signal peak, or when the slope changes from negative to positive.

It is an object of the invention to provide such a peak value detector for operation with an analyzer having a motor driving circuit and an output motor driven in both directions by the driving circuit with the direction being a functon of the slope of a signal peak, and with the output motor and the motor of the peak value detector both driven by the driving circuit so that the peak value detector motor tends to track the analyzer output motor.

It is a particular object of the invention to provide new and novel motor driving circuits for driving both the analyzer output motor and the peak value detector motor. A further object is to provide an apparatus including a magnetically operable switch for controlling an output device, and means carried by the peak value detector motor for movement toward and away from the switch as a function of the slope of the signal peak, with the motor being operable over a very limited range and actuating the switch when at one extreme of the range.

It is an object of the invention to provide a peak value detector apparatus which is equally suitable for use with recording equipment and with control equipment.

Further objects and advantages of the invention will more fully appear in the course of the following description. The drawing merely shows and the description merely describes preferred embodiments of the present invention which are given by way of illustration or example.

In the drawing:

FIG. 1 is a block diagram illustrating one system for utilizing the detector of the invention;

FIG. 2 is a block diagram illustrating an alternative system for utilizing the detector of the invention;

FIG. 3 is a circuit diagram of a preferred embodiment of the detector or peak picker;

FIG. 4 illustrates the arrangement of the mechanical parts of the embodiment of FIG. 3; and FIG. 5 is a circuit diagram of an alternative embodiment corresponding to that of FIG. 3.

The system of FIG. 1 includes a gas chromatograph 10, a peak selector 11, a recorder servo 12, a recorder 13, a peak picker or slope change detector 14, and a relay 15. The chromatograph, peak selector, recorder servo and recorder may be of the type shown in the aforesaid U.S. patent or the aforesaid copending application. The peak picker functions in the same manner as that described in the aforesaid patent and application, but has an entirely different structure, as will be described below.

The output of the gas chromatograph will be an electrical signal in the form of a train of signal peaks. Ordinarily, only one or a few of the peaks are of interest and the peak selector is used to connect the chromatograph output to the recorder servo only when peaks of interest are being generated. The recorder servo ordinarily will include a motor which drives the chart marking device, first moving upscale with a positive slope as the magnitude of the signal peak increases and then moving downscale with a negative slope as the magnitude of the signal peak decreases. The recorder servo is normally disconnected from the recorder, as by switch 16 of the relay 15.

The signal peaks of interest are also connected as inputs to the peak picker 14, either from the peak selector or from the recorder servo output. The peak picker includes a switch 17 which is actuated when the signal peak reaches a maximum, i.e., when the signal peak slope changes from positive to negative. Closing of the switch 17 energizes the relay 15 and in turn closes the switch 16. When the switch 16 is closed, the recorder 13 is actuated to record the value of the signal peak, which is the maximum value as determined by the peak picker. The recorder 13 may be of the type which makes only a single indication at the time it is actuated. This type of recorder is shown in the aforesaid U.S. patent. Alternatively, the relay 15 may be of the type which momentarily closes the switch 16 when the relay is energized. As another alternative, the recorder 13 could be mechanically or hydraulically driven from the recorder servo 12, with the switch 16 being a clutch or valve.

Another system for utilizing the invention is shown in FIG. 2 and includes a gas chromograph 20, a recorder servo 21, a recorder 22, a peak selector 23, a peak picker 24, a relay 25, a storage system 26, and a system to be controlled 27. In this system, the chromatograph output is continuously recorded in the recorder 22. Only the maximum value, as determined by the peak picker 24, of a particular signal peak, as determined by the peak selector 23, is coupled to the storage unit 26. The relay 25 is energized through switch 30 of the peak selector and switch 31 of the peak picker to actuate switch 32 of the relay. This maximum value is stored in the storage unit 26 to provide a continuous output signal for the system to be controlled 27, which may be a chemical process or merely a continuous recorder. Typical storage units and continuous recorders are shown in the aforementioned copending application.

A preferred form of the peak picker unit of the invention is shown in FIGS. 3 and 4. The peak picker includes a reversible motor 40 which is operated in conjunction with a similar reversible motor 41 of the recorder servo. The motor 40 is a two-phase A.C. motor having one phase winding 42 energized from an A.C. source through a phasing capacitor 43 and the other phase winding 44 energized from an amplifier indicated generally at 45. The motor 41 may be identical to the motor 40 and the two motors are connected for driving from the same amplifier so that the peak value detector motor tends to track the recorder servo motor. In the particular circuit shown herein, the two motors have their variable phase windings connected in series, but of course, they could be connected in parallel.

The motor driving circuit includes two three-element amplifier units 46, 47 with an input line 48 connected to the control element of each of the amplifier units. The output from the amplifier unit 46 is connected to the motor windings through one half of the secondary winding 49 of a transformer 50 and the output of the other unit 47 is connected through the other half of the secondary winding. An A.C. reference voltage is connected to the primary 51 of the transformer 50. A resistor 52 may be connected in parallel with the reversible phase winding of one of the motors, here the motor 40, for controlling the distribution of power between the two motors.

A positive going voltage or a signal with a positive slope on the line 48 will cause both motors to run in one direction, say clockwise, while a negative going voltage or a signal with a negative slope will cause both motors to run in the opposite direction. The peak value detector motor 40 is shown in FIG. 4, including an output shaft 53 with an arm 54 fixed thereto. Stop means are included in the motor for limiting travel of the arm to a relatively small range. The stop means are shown here as pins 55, 56. When a signal peak is connected as an input to the amplifier of FIG. 3, the arm 54 is rotated clockwise to rest against the stop 56 and remains in this position while the magnitude of the signal peak continues to increase. When the magnitude of the signal peak reaches a maximum and starts to decrease, the phase of the signal in the winding 40 of the motor reverses and the arm 54 is driven counterclockwise to rest against the stop 55. Since the range of travel of the motor is quite small, this motion is accomplished in a very short time. A switch, corresponding to the switch 17 of FIG. 1 or the switch 31 of FIG. 2, is positioned adjacent the stop 55 for actuation by the motor. This switch may be a reed-type switch having flexible members 57, 58 enclosed in a housing 59. The members 57, 58 are normally biased away from each other and are adapted to be brought into contact with each other when exposed to a magnetic field. A magnet 60 is carried at the end of the arm 54 and serves to actuate the switch when the arm engages the stop 55. In an alternative form, the switch could be positioned adjacent the stop 56 and be actuated when the arm moves away from the stop.

An alternative form for the motor driving circuit of FIG. 3 is shown in FIG. 5, wherein a single-ended amplifier stage is utilized. The input signal on the line 48 is connected to the control grid of a pentode amplifier tube 61 through a capacitor 62. The reversible phase windings of the two motors 40, 41 are connected as the plate load on the tube, with the circuit operating in the same manner as the circuit of FIG. 3 to drive the motors clockwise and counterclockwise.

The peak detector of the invention may be used to determine the minimum value of a signal peak. This information is of value when it is desired to measure the area under the peak, which area may be related to the proportions of various constituents in a sample being analyzed in a chromatograph. Typically, the peak detector may be used to acutate means for introducing a mark or short deflection of the chart marker in a conventional strip chart recorder. When used with one of the presently available area calculating recorders, the peak detector can be used to terminate the area calculation. This mode of operation may be accomplished using the circuitry of FIGS. 3, 4 and 5 by reversing the polarity of the control winding 44 of the motor 40. Then the switch of FIG. 4 would be closed when the slope of a peak changes from negative to positive. The peak picker switch may be used to control a relay which produces a marker pulse in the recorder which is being continuously driven by the recorder servo.

The unique peak value detector or peak picker apparatus described and illustrated herein is particularly adapted for use with signals having noise therein. The instrument can be operated to ignore high speed transients or noise spikes while being highly sensitive to the change of phase produced by the change of slope of a signal peak. Hence the apparatus has the desired sensitivity of peak detection while being relatively insensitive to spurious noises, and is inexepnsive, simple and reliable.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a peak value detector for operation with a chromatographic analyzer or the like which produces an electrical output in the form of a train of signal peaks, the analyzer including a motor driving circuit and an output motor driven in both directions by said driving circuit with the direction being a function of the slope of a signal peak, the combination of:

a second motor driven by said motor driving circuit so that second motor tends to track said output motor;
a pair of stops for limiting the movement of said second motor to a relatively small range;
electrical switch means for controlling an output device; and
means carried by said second motor for actuating said switch means when at one of said limit stops, with said second motor moving from one stop to the other and actuating said switch means when the slope of a peak changes.

2. An apparatus as defined in claim 1 in which said second motor actuates said switch means when the slope of a peak changes from positive to negative.

3. An apparatus as defined in claim 1 in which said second motor actuates said switch means when the slope of a peak changes from negative to positive.

4. In a peak value detector for operation with a chromatographic analyzer or the like which produces an electrical output in the form of a train of signal peaks, the analyzer including a motor driving circuit and an output motor driven in both directions by said driving circuit with the direction being a function of the slope of a signal peak, the combination of:

a second motor connected in series with said output motor for operation by said driving circuit so that said second motor tends to track said output motor;
a pair of stops for limiting the movement of said second motor to a relatively small range;
electrical switch means for controlling an output device; and
means carried by said second motor for actuating said switch means when at one of said stops, with said second motor moving from one stop to the other and actuating said switch means when the slope of a peak changes.

5. In a peak value detector for operation with a chromatographic analyzer or the like which produces an electrical output in the form of a train of signal peaks, the combination of:

a motor driving circuit having an output varying in phase as a function of the slope of a signal peak connected as an input thereto;
first and second reversible motors, with said first motor adapted for driving a recorder system;
means for connecting said driving circuit output to each of said motors for controlling the direction of rotation thereof as a function of said output phase;
stop means for limiting the movement of said second motor for a relatively small range between stops;
electrical switch means for controlling an output device; and
means carried by said second motor for actuating said switch means when at one of said stops, with said second motor moving from one stop to the other and actuating said switch means when the slope of a peak changes.

6. In a peak value detector for operation with a chromatographic analyzer or the like which produces an electrical output in the form of a train of signal peaks, the combination of:

a motor driving circuit comprising a pair of amplifiers energized from A.C. sources in phase opposition and having a common input and a common output, with the output varying in phase as a function of the slope of a signal peak connected as an input thereto;
first and second reversible motors, with said first motor adapted for driving a recorder system;
means for connecting said driving circuit output to each of said motors for controlling the direction of rotation thereof as a function of said output phase;
stop means for limiting the movement of said second motor to a relatively small range between stops;
electrical switch means for controlling an output device; and
means carried by said second motor for actuating said switch means when at one of said stops, with said second motor moving from one stop to the other and actuating said switch means when the slope of a peak changes.

7. In a peak value detector for operation with a chromatographic analyzer or the like which produces an electrical output in the form of a train of signal peaks, the analyzer including a motor driving circuit and an output motor driven in both directions by said driving circuit with the direction being a function of the slope of a signal peak, the combination of:

a second motor driven by said motor driving circuit so that said second motor tends to track said output motor;
stop means for limiting the movement of said second motor to a relatively small range between stops;
an electrical switch for controlling an output device and adapted for actuation by a magnetic field;
a magnet carried by said second motor for actuating said switch; and
means for mounting said switch adjacent said magnet when at one of said stops, with said second motor moving from one stop to the other and actuating said switch when the slope of a peak changes.

8. In a peak value detector for operation with a chromatographic analyzer or the like which produces an electrical output in the form of a train of signal peaks, the combination of:

a motor driving circuit having an output varying in phase as a function of the slope of a signal peak connected as an input thereto;
a reversible drive motor;
means for connecting said driving circuit output to said motor for controlling the direction of rotation thereof as a function of said output phase;
stop means for limiting the movement of said motor to a relatively small range between stops;
electrical switch means for controlling an output device; and
means carried by said motor for actuating said switch means when at one of said stops, with said motor moving from one stop to the other and actuating said switch means when the slope of a peak changes.

9. In a peak value detector for operation with a chromatographic analyzer or the like which produces an electrical output in the form of a train of signal peaks, the combination of:

a motor driving circuit comprising an amplifier having an input varying in phase as a function of the slope of a signal peak of the analyzer output;
first and second reversible motors, with said first motor adapted for driving a recorder system;
means for connecting said motors as a load for said amplifier for driving said motors and controlling the direction of rotation thereof as a function of the phase of said amplifier output;
stop means for limiting the movement of said second motor to a relatively small range between stops;
electrical switch means for controlling an output device; and
means carried by said second motor for actuating said switch means when at one of said stops, with said second motor moving from one stop to the other and actuating said switch means when the slope of a peak changes.

10. In a peak value detector for operation with a chromatographic analyzer or the like which produces an electrical output in the form of a train of signal peaks, the combination of:

a motor driving circuit having an output varying in phase as a function of the slope of a signal peak connected as an input thereto;
an output motor;
a control motor;
means for connecting said driving circuit output to each of said motors for controlling the direction of rotation thereof as a function of said output phase;
stop means for limiting the movement of said control motor to a relatively small range between stops;
electrical switch means for coupling said output motor to an output system; and
means carried by said control motor for actuating said switch means when at one of said stops, with said control motor moving from one stop to the other and actuating said switch means when the slope of a peak changes from positive to negative.

11. In a peak value detector for operation with a chromatographic analyzer or the like which produces an electrical output in the form of a train of signal peaks, the combination of:
a motor driving circuit having an output varying in phase as a function of the slope of a signal peak connected as an input thereto;
an output motor;
a control motor;
a recorder system driven by said output motor;
means for connecting said driving circuit output to each of said motors for controlling the direction of rotation thereof as a function of said output phase;
stop means for limiting the movement of said control motor to a relatively small range between stops;
electrical switch means for coupling a control signal to said recorder system; and
means carried by said control motor for actuating said switch means when at one of said stops, with said control motor moving from one stop to the other and actuating said switch means when the slope of a peak changes from negative to positive.

No references cited.